United States Patent [19]
Shemula

[11] Patent Number: 5,905,790
[45] Date of Patent: May 18, 1999

[54] SINGLE PHONE LINE DEVICE FOR AUTOMATIC INTERCONNECTION FROM A REMOTE LOCATION

[76] Inventor: David Shemula, 5524 Ventura Canyon Ave., Sherman Oaks, Calif. 91401

[21] Appl. No.: 08/803,269

[22] Filed: Feb. 20, 1997

[51] Int. Cl.[6] ...................................................... H04M 3/42
[52] U.S. Cl. ......................... 379/212; 379/202; 379/204; 379/352; 379/88.19
[58] Field of Search .................................. 379/67, 88, 89, 379/201, 202, 204, 205, 206, 210, 211, 212, 352

[56] References Cited

U.S. PATENT DOCUMENTS 4,893,335  1/1990  Fuller et al. ............................. 379/200

Primary Examiner—Fan S. Tsang
Assistant Examiner—Shih-Wen Hsieh
Attorney, Agent, or Firm—Monty Koslover

[57] ABSTRACT

An interconnect circuit is described which provides automatic three-way connection between a single base telephone line and any telephone destination, while under control of a caller from a remote location. The device may be used to make long distance calls or local calls, automatically connecting the lines to the remote caller, while telephone charges are billed to the single base telephone account. The invention device incorporates a programmable microprocessor that operates the circuit according to a program and will also accept instructions from the remote caller to program the calls in any given sequence or combination. Circuit components are operated low in stress, at low power and are few in number. Thus the circuit has high reliability and the device is low cost.

1 Claim, 2 Drawing Sheets

SINGLE PHONE LINE DEVICE FOR AUTOMATIC INTERCONNECTION FROM A REMOTE LOCATION

BACKGROUND OF THE INVENTION

1. Field of the Invention

This invention relates to devices for providing automatic interconnection between a remotely located telephone and one or more lines, and more particularly to providing a means whereby a person can remotely access his home telephone and have his home single telephone line automatically connected with any requested telephone location.

2. Background

It has long been an expressed desire of business men and women, particularly self-employed professionals such as medical doctors and lawyers, to be able to remotely call their office telephone and have their office telephone place long distance or local calls, charging the calls to the office telephone. In response, a number of systems have been devised and marketed over past three decades. A typical prior art system is described in U.S. Pat. No. 4,086,438 issued to D. W. Kahn et al on Apr. 28, 1978. Kahn et al describe a system for automatically providing interconnection among a plurality of telephone lines serving a subscriber station, all under the control of a remotely located caller. While some of the prior art devices use single phone lines, the Kahn et al device advantages over the prior art depend on its complex use of multiple telephone lines. The Kahn et al device itself is exceedingly complex in circuitry, having many components and requiring a significant input power and heat dissipation.

Other telephone interconnection systems such as that described In U.S. Pat. No. 3,689,702 issued to T. E. McCay on Sep. 5, 1972, are able to utilize a telephone subscriber, calling it remotely, and making repeated calls without the caller having to hang up. However, the McCay device can not accept remote caller instruction to make more than one type of phone call. The McCay device is thus limited to essentially a two-way operation, connecting its remote caller to a long distance phone destination.

There is therefore a need for an interconnect device that can automatically provide a three-way interconnection line between a single telephone line, any telephone destination and a remote caller, while under the remote caller's control and which is small in size, high in reliability and low in cost.

SUMMARY OF THE INVENTION

The present invention device provides an automatic interconnection between a single telephone line and any telephone destination in the world. It includes a three-way calling feature that is under the control of a caller from a remote location. The device may be used to make long distance calls or local calls, automatically connecting the lines to the remote caller, either immediately or calling back the remote location after he hangs up. The invention device will also accept instructions from the remote caller to vary the calls in a given manner, such as making conference calls.

The device interconnect unit consists of a circuit in a small, compact container that has external connectors for connection to an outside telephone line, a single telephone line and a 5 VDC power supply. The circuit components includes a programmable microprocessor with memory storage, a voice recorder, a signal transceiver, and a surge protection circuit. Integrated circuits are used where possible and the relatively few discrete components are operated at low power and low stress levels.

An advantage of the invention over presently available interconnection devices is its small, compact size and high operating reliability because of its small component count and simplicity. A further advantage accruing from the use of few components is the relatively low cost of the device compared with presently available devices.

Accordingly, it is a principal object of this invention to provide a means of automatic interconnection between a single telephone line and any telephone destination, under the control of a remote caller.

Another object is to provide an automatic interconnection device for single telephone lines that is small in size and compact. Yet another object is to provide a device that is low in cost.

Further objects and advantages of the invention will be apparent from studying the following portion of the specification, the claims and the attached drawings.

DESCRIPTION OF THE PREFERRED EMBODIMENT

Figure 1:
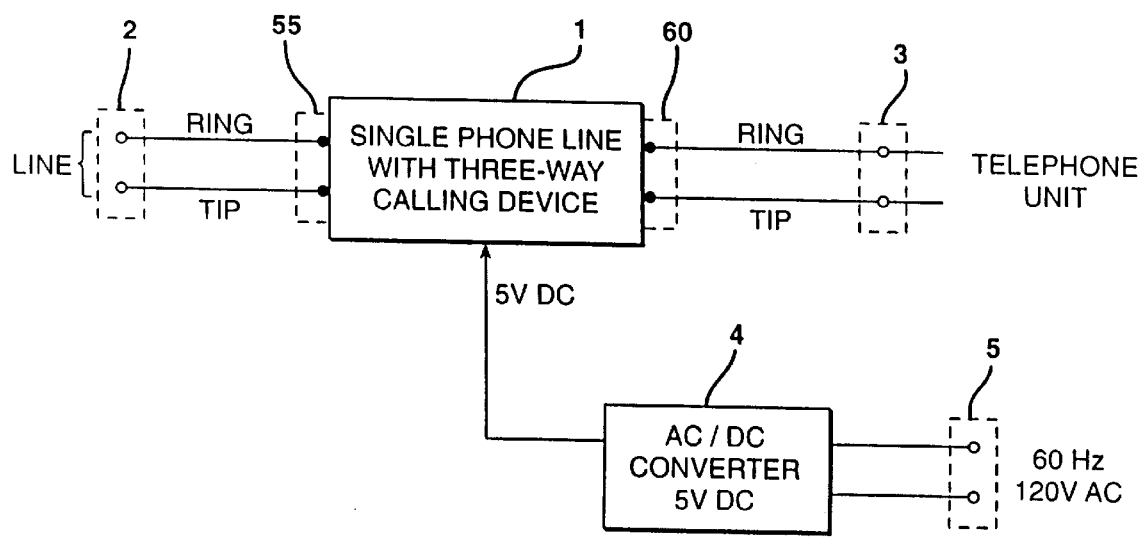
FIG. 1 is a diagram showing the invention device connected to a telephone line, to a telephone unit and to an AC/DC converter.

Referring particularly to the drawings, there is shown in FIG. 1 a representation of the invention device 1, hereafter referred to as the "interconnect unit", connected in place for use. Two interconnect unit 1 terminals 55 are connected to the line 2, and two interconnect unit terminals 50 are connected to a single telephone 3. These terminals 50 may instead be connected to an answering machine if so desired. The interconnect unit 1 is also connected to the output of an ac/dc converter 4, which in turn is plugged in to a 60 Hz, 120 Vac outlet 5. The ac/dc converter 4 provides 5 Vdc power to the interconnect unit 1 required to power its components. The characteristics of the ac outlet power are not important as long as the ac/dc converter 4 is able to produce 5 Vdc output power. This ac/dc converter 4 is typically a standard, available small converter used universally for powering small electronic devices and is not part of the invention. The interconnect unit 1 itself is packaged in a small, compact container a few inches in length, and produces little heat dissipation, requiring no special cooling.

The interconnect unit 1 functions enable a person who can input the correct security code to make telephone calls from a remote location to any destination, via his home base single telephone line, with all toll charges going to his home phone. Operation of the system is as follows: An incoming call from a remote caller is automatically answered by the interconnect unit 1 after a short period and requests entry of the security code. After the correct security code is entered by the remote caller, the interconnect unit 1 asks the remote caller to input the desired long distance phone number, and when this is done, it makes the call, connecting it also to the remote caller's location. When this call is concluded, the remote caller may request another number, making as many calls as he desires while remaining on a single line. During this time, if calling from a public phone, the remote caller will be charged only for his time connected from his remote location to his home telephone.

In a second option, the remote caller may, after entering his security code, enter a call-back number to the system and then hang up. The interconnect unit 1 will then dial him back and allow the caller to make as many calls as he desires to any telephone destination, with the charges going to his own home telephone line account.

The interconnect unit 1 can be also used in other ways. For example, the unit may be set to automatically call a series of phone numbers one after the other after being instructed by the remote caller, deliver pre-recorded messages and record the responses for later playback. This and other possible uses are facilitated by the microprocessor programming which can be adapted to most user requirements.

It is important to note that all the above described capability requires is a single phone line to which the interconnect unit 1 is connected. The invention interconnect unit accomplishes this using only a few electronic components mounted on a small circuit board. Multiple lines and complex switching units are not required as is usually the case for presently available and prior art interconnection systems.

Figure 2:
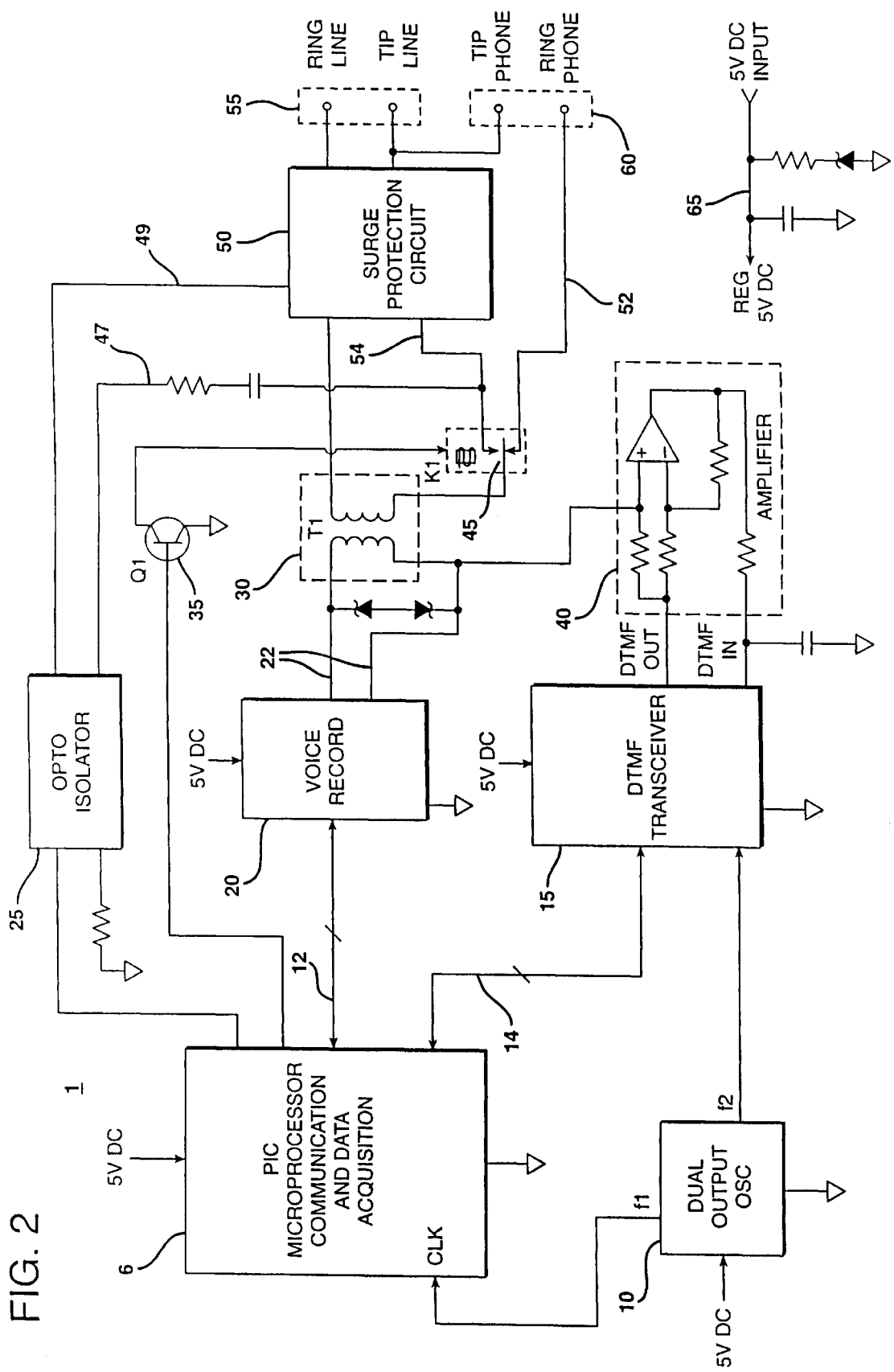
FIG. 2 is a simplified schematic and block diagram of an automatic, three-way interconnection circuit for telephone use in accordance with the present invention.

Refer now to FIG. 2 which is a simplified schematic and block diagram of an automatic, three-way interconnection circuit in accordance with the present invention. The interconnect unit 1 circuit comprises a programmable IC (PIC) microprocessor 6, a dual output oscillator 10, a DTMF transceiver 15, a voice recorder 20, an opto-isolator 25, a transformer (T1) 30, a transistor (Q1) 35, an amplifier circuit 40, a relay (K1) 45, an input surge protection circuit 50, a +5 Vdc supply circuit 65, supporting circuit components, an outside line signal terminal 55 and a phone signal terminal 60.

A description of the major components is as follows: The microprocessor 6 is a programmable device that includes registers for storage of data, and will place and receive a signal via its input/output pins according to a written program entered during manufacture of the interconnect unit. The microprocessor 6 will store phone numbers entered by a remote user, place the phone calls, provide and receive instruction from the user, and switch the phone hook to flash, answer or hang up when required.

The DTMF transceiver 15 will code incoming DTMF tones to 4 bit BCD for transmission to the microprocessor 6, and will also code 4 bit BCD from the microprocessor 6 to DTMF tones for external transmission. The voice recorder 20 receives input audio signals from the user and transmits the converted input signals to the microprocessor 6. It also transmits pre-recorded audio signals to the external line when prompted by the microprocessor 6.

In operation, during the microprocessor 6 rest mode when no calls are in progress, the K1 relay 45 is not energized and connects the primary of T1 transformer 30 in series with the outside line terminal 55, through a conductor 52 to the phone set or answering machine terminals 60. In this way, the phone line is monitored. When an incoming call is made, the microprocessor monitors the line. It counts the rings through signals received via the opto-isolator 25 which is connected by conductors 47, 49 across the surge protection circuit 50 output. If the outside line call is answered before six rings, the microprocessor 6 will monitor the line via the secondary of T1 transformer 30, the DTMF amplifier circuit 40, the DTMF transceiver 15 and an I/O bus 14 for the correct activation code. If the outside line call is not answered after six rings are counted, or the correct activation code has been received, the microprocessor 6 will send a 5 Volt signal to the base of the Q1 transistor 35, turning the transistor on and energizing the coil of the K1 relay 45. When the K1 relay is energized, it disconnects the outside line from the phone set conductor 52 and connects the outside line to the TIP line 54, effectively through the T1 transformer 30 and DTMF amplifier 40 to the DTMF transceiver 15. The DTMF transceiver 15 can then transmit to the microprocessor 6 any tones it receives from the outside line, and also transmit signals from the microprocessor to the outside line. At the same time the voice recorder 20 is connected to the outside line through the T1 transformer 30 secondary and conductors 22 across the secondary. The voice recorder 20 is connected to the microprocessor 6 by an I/O bus 12, so that the microprocessor 6 can initiate a voice output or receive a coded voice input.

Now that the outside phone line has been connected to the microprocessor 6 via the transceiver 15 and the voice recorder 20, the microprocessor can perform its program, receiving and sending tones out to the line, controlling the hook status, sending and receiving instructions from the user, storing input phone numbers, placing phone calls, answering and hanging up. The microprocessor may also be programed to perform conference calls. However, this would require the addition of a telephone line to the existing home base telephone.

A dual output oscillator 10 supplies a frequency f1 signal to the Clock input of the microprocessor 6, and a frequency f2 signal to the DTMF transceiver 15 as a reference. A +5 Vdc supply circuit 65 receives unregulated +5 Vdc power from an unregulated source and provides regulated +5 Vdc power connected to all components requiring it. The supply circuit 65 typically comprises a capacitor paralleled with a series connected resistor and a 5.2 V Zener diode which acts as a voltage limiter.

A surge protection circuit 50 is provided connected between the outside line terminals 55 and the T1 transformer 30 primary. This circuit 50 typically contains inductors, capacitors, resistors and an MOV connected to protect the sensitive components of the interconnect unit from possible input signal spikes and EMF.

Finally, it is clear that the device is a low voltage, low power consumption circuit which can be accommodated on a printed circuit board having few integrated circuit components and low power resistors and capacitors.

All electronic components are selected to produce low voltage and current stress. This combined with low heat dissipation requirements and a small quantity of critical components in the device results in a projected high reliability for the invention device.

The relative simplicity of the device compared with state of the art telephone interconnect devices ensures that the present invention will cost less to produce than the available telephone interconnect devices.

These characteristics and advantages make the invention a significant improvement on the state of the art devices.

From the above description, it is clear that the preferred embodiment achieves the objects of the present invention. Alternative embodiments and various modifications may be apparent to those skilled in the art. These alternatives and modifications are considered to be within the spirit and scope of the present invention.

Having described the invention, what is claimed is:

1. An automatic interconnect circuit for use with a single telephone line, said interconnect circuit comprising in combination:

(a) a programmable microprocessor;

(b) a DTMF transceiver, connected by a first input/output bus to said microprocessor;

(c) a dual output oscillator having one output connected to said microprocessor CLK terminal and its other output connected to said DTMF transceiver;

(d) a voice recorder circuit connected by a second input/output bus to said microprocessor;

(e) an opto-isolator connected to said microprocessor;

(f) a transistor switch connected to said microprocessor;

(g) an amplifier circuit connected to said DTMF transceiver for processing DTMF tones into and out of said DTMF transceiver;

(h) an isolation transformer, having both terminals of its secondary coil connected to said voice recorder, and said secondary coil connected in series with said amplifier circuit;

(i) an outside phone line connector and an inside phone line connector;

(j) a surge protection circuit having its input connected across the lines from said outside phone line connector and its output lines connected to the primary coil of said isolation transformer, said output lines also being connected to input terminals of said opto-isolator; said protection circuit acting to limit the amplitude of signals input to said interconnect circuit components from said outside line connector;

(k) a relay, said relay having its coil winding connected to the collector output of said transistor switch and also to ground; said relay being a single pole, double throw type having first and second contacts; said primary coil of said transformer being connected to the center pole terminal of said relay; said first contact being connected to an output of said surge protection circuit, said second contact being connected to the RING terminal of said inside phone line connector, said relay, when not energized, connecting said primary coil of said transformer in series with said second contact and with said RING terminal of said inside phone line connector; and (l) a 5 Vdc supply circuit supplying regulated +5 Vdc power to all components requiring a +5 Vdc input in said interconnect circuit;

said microprocessor including means for significant memory storage and incorporating programs to monitor incoming calls, receive and request an authorized activation code, receive calling instruction from a remote caller, make long distance or local calls and connect them to a remote caller phone at the direction of the remote caller, flash, hang-up or otherwise output signals as instructed by a remote caller;

said voice recorder including means for storing and transmitting to said microprocessor received audio signals and transmitting to the outside line, signals received from said microprocessor;

said DTMF transceiver converting received DTMF tones to 4 bit BCD for transmission to said microprocessor, and converting received 4 bit BCD to DTMF tones for external transmission;

said microprocessor monitoring the outside phone line for rings through said opto-isolator and connections to the output of said surge protection circuit; said microprocessor, after six rings are counted or the correct activation code is received, applying a 5 volt signal to the base of said transistor switch, turning said transistor switch on and energizing the coil of said relay, causing said relay to disconnect said outside phone line connector from said inside phone line connector, connecting said outside phone through said transformer to said voice recorder and to said DTMF transceiver; said microprocessor now being able to perform its program in placing and receiving calls under the direction and control of a remote caller.

* * * * *